UNITED STATES PATENT OFFICE.

RAY P. SAFFOLD, OF DOUGLAS, ARIZONA.

COMPOSITION FOR LINING OR COVERING SURFACES.

1,185,722.   Specification of Letters Patent.   Patented June 6, 1916.

No Drawing.   Application filed August 17, 1914.   Serial No. 857,246.

*To all whom it may concern:*

Be it known that I, RAY P. SAFFOLD, a citizen of the United States, residing at Douglas, in the county of Cochise and State of Arizona, have invented certain new and useful Improvements in Composition for Lining or Covering Surfaces; and I do hereby declare the following to be a full, clear, and exact description of the invention, such as will enable others skilled in the art to which it appertains to make and use the same.

My invention relates to improvements in linings, coatings, or coverings for vessels, vehicles, roofs or other surfaces, to render the same immune to the action of acids, water, liquid, or other fluids or materials tending to corrode, or otherwise affect or destroy the same.

The invention embodies the coating of any or all surfaces, subjected to the action of acids or other corrosive or destructive materials, with a composition composed of asphaltum, or any substances containing asphaltum, dissolved in any of its solvents, or solvent mixtures, such as, carbon bi-sulfid, gasolene, or benzin, or reduced to a liquid or semi-liquid state by heat, to which is added calcium sulfate, either pure or in its compounds or its native occurrences, such as gypsum, and the like; and powdered silica, or sodium sulfate may be substituted for calcium sulfate.

The proportions of each ingredient depend upon the grade or purity of the asphaltum, and upon the chemical purity of the calcium or sodium sulfate to be admixed with the asphaltum. To the mixture thus obtained is added sand or silica in sufficient quantity depending upon the local conditions and upon the surface to be coated, although these latter ingredients may be dispensed with without rendering the coating inefficient for the purpose desired.

While the proportions of the several ingredients depend upon local conditions, as temperature, etc., and may be varied to a marked degree without departing from the spirit of the invention or rendering the coating or lining inefficient for its purpose, the following proportions have been found to be most suitable for general untility:—Asphaltum solution 1¼ parts. Calcium sulfate two parts, powdered silica, 1 part, to which may be added one part of sand or silica if desired. An equal number of parts of sodium sulfate may be substituted for the calcium sulfate. The mixture, thus obtained, is spread over the surface to provide a coating of the proper thickness, and while adaptable for application to any surface to be protected against corrosion, or the like, it has been more particularly designed as a protective lining for acid containers, launders or the like.

Having thus fully described my invention, what I claim is;—

1. A non-corrosive composition consisting of asphaltum, dissolved in any of its solvents, and admixed with calcium sulfate and silica, substantially in the proportions described.

2. A non-corrosive composition consisting of asphaltum, one and one-half parts, dissolved in any of its solvents, and admixed with calcium sulfate, two parts, and silica, one part.

In testimony whereof I affix my signature, in presence of two witnesses.

RAY P. SAFFOLD.

Witnesses:
 G. C. FISHER,
 H. L. NOBLE.